UNITED STATES PATENT OFFICE.

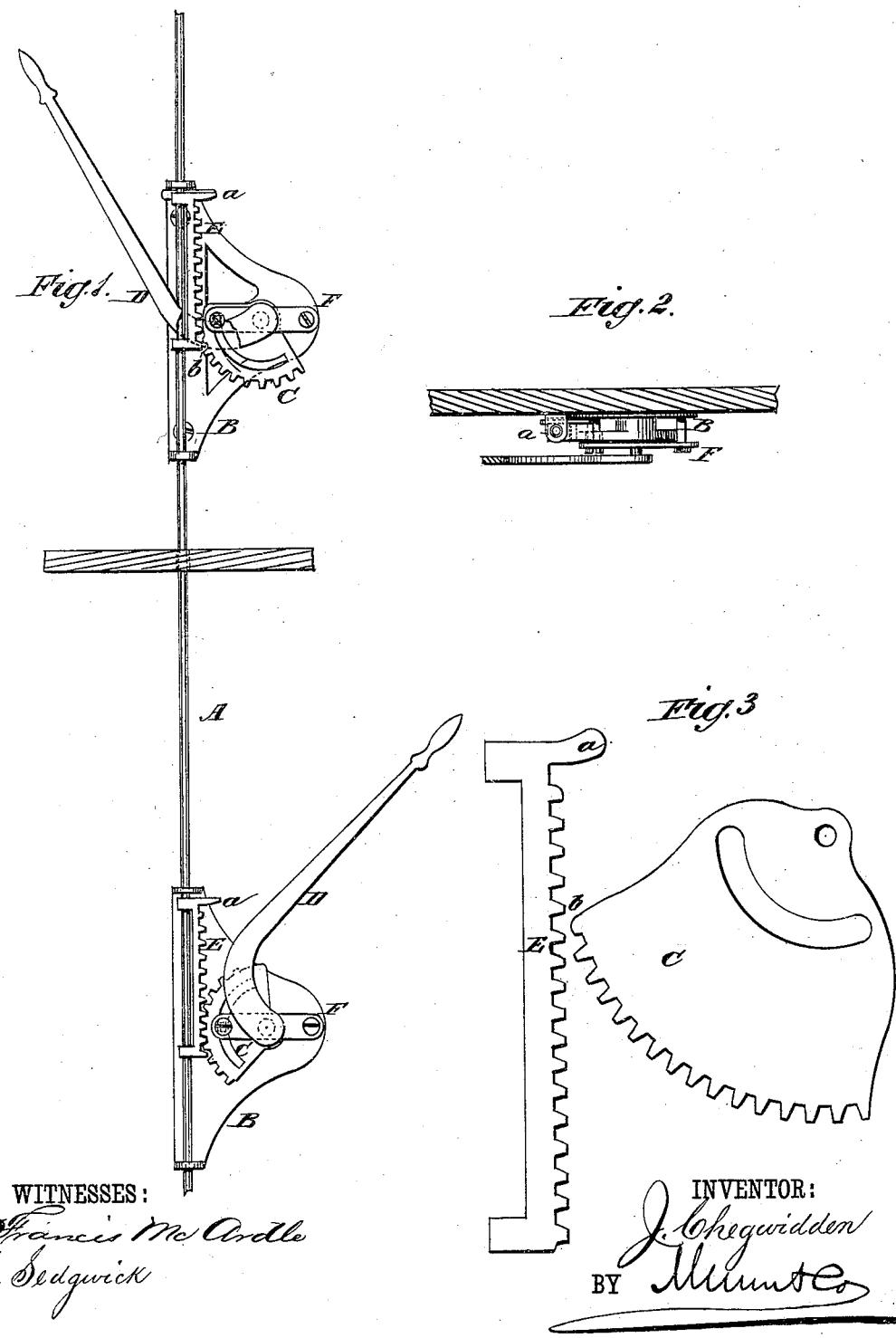

JOHN CHEGWIDDEN, OF NEW YORK, N. Y.

IMPROVEMENT IN PUMP-HANDLES.

Specification forming part of Letters Patent No. 205,526, dated July 2, 1878; application filed May 18, 1878.

*To all whom it may concern:*

Be it known that I, JOHN CHEGWIDDEN, of the city, county, and State of New York, have invented a new and Improved Pump-Handle, of which the following is a specification:

Figure 1 is a front elevation. Fig. 2 is a plan view. Fig. 3 is a detail view of the pump-operating gearing.

Similar letters of reference indicate corresponding parts.

My invention relates to pump-handles for operating a single pump from different floors of a building; and it consists in the combination of a series of racks and toothed sectors of peculiar construction with a series of handles and a rod which extends from the pump through two or more floors, whereby any handle in a series of handles connected with a single pump-rod may be operated without moving the other handles.

Referring to the drawing, A is a pump-rod, which is of sufficient length to extend through the several stories of the building, and B is a casting, forming the guiding for the rod, and also the support for the toothed sector C and the handle D.

The castings B are placed at a convenient height above the several floors, and upon the pump-rod A, between the ears that form the guides, a rack, E, is secured. The upper tooth $a$ of the rack is much longer than the others, and the relative length of the casting B and the rack E is such as to admit of moving the rod A through a distance equal to the stroke of the pump-plunger.

The casting B is apertured to receive the gudgeons of the toothed sector C, and also to receive bolts that bind to it the cross-bar F, that supports the outer gudgeon of the toothed sector. The toothed sector is slotted to allow the bolt that holds the bar F to pass through it, and its teeth are capable of engaging the rack E. The upper tooth $b$ of the sector is made shorter than the others to facilitate its disengagement from the rack.

A curved handle, G, is attached to the outer gudgeon of sector.

When the handle on any of the floors is not in use, the toothed sector connected with it is thrown out of the rack on the pump-rod.

When either of the handles is raised it throws the toothed sector connected with it into engagement with the rack on the pump-rod.

Having thus described my invention, I claim as new and desire to secure by Letters Patent—

The combination of the rack E, having a long tooth, $a$, and the toothed sector C, having the short tooth $b$, substantially as shown and described.

JOHN CHEGWIDDEN.

Witnesses:
  GEO. M. HOPKINS,
  C. SEDGWICK.